(12) United States Patent
Suzuka et al.

(10) Patent No.: US 7,947,359 B2
(45) Date of Patent: May 24, 2011

(54) HIGH TENACITY NONWOVEN FABRIC

(75) Inventors: Ryuji Suzuka, Moriyama (JP); Mitsuji Nakakita, Moriyama (JP)

(73) Assignee: Asahi Kasei Fibers Corporation, Osaka-Shi (JP)

( * ) Notice: Subject to any disclaimer, the term of this patent is extended or adjusted under 35 U.S.C. 154(b) by 246 days.

(21) Appl. No.: 10/553,605

(22) PCT Filed: Apr. 22, 2004

(86) PCT No.: PCT/JP2004/005785
§ 371 (c)(1),
(2), (4) Date: Oct. 18, 2005

(87) PCT Pub. No.: WO2004/094136
PCT Pub. Date: Nov. 4, 2004

(65) Prior Publication Data
US 2006/0292954 A1 Dec. 28, 2006

(30) Foreign Application Priority Data
Apr. 22, 2003 (JP) .................. 2003-116957

(51) Int. Cl.
*B32B 5/26* (2006.01)
(52) U.S. Cl. ........ 428/220; 428/332; 428/340; 428/903; 442/340; 442/345; 442/381; 442/387
(58) Field of Classification Search ................ 15/209.1, 15/223; 128/849; 165/290; 428/196, 198, 428/200, 220, 332, 340, 903; 442/340, 346, 442/327, 353, 345, 382, 381, 387; 264/171.1
See application file for complete search history.

(56) References Cited

U.S. PATENT DOCUMENTS
3,494,819 A * 2/1970 Mcalister, Jr. ................ 442/181
5,145,727 A 9/1992 Potts et al.
(Continued)

FOREIGN PATENT DOCUMENTS
CN 2343184 Y 10/1999
(Continued)

OTHER PUBLICATIONS
Fourne, Franz. (1999) Synthetic Fibers—Machines and Equipment Manufacture, Properties. (pp. 74-76). Hanser Publishers. Online version available at: http://www.knovel.com/knovel2/Toc.jsp?BookID=1005&VerticalID=0.*

(Continued)

*Primary Examiner* — Elizabeth M Cole
(74) *Attorney, Agent, or Firm* — Finnegan, Henderson, Farabow, Garrett & Dunner, L.L.P.

(57) ABSTRACT

The present invention provides a laminated nonwoven fabric wherein the nonwoven fabric is a laminated one formed by integrating, through compressive bonding, a stacked nonwoven fabric structure comprising an upper and a lower thermoplastic synthetic filamentary fiber layer that have a fiber diameter from 7 μm or more to 20 μm, and an intermediate layer composed of thermoplastic synthetic fine fibers that have a fiber diameter of 5 μm or less, the laminated nonwoven fabric having an intimately mixed structure in which a portion of the fine fibers is intruded into at least one face side of the filamentary fiber layers with an intrusion index of 0.36 or more to bond, surround or interlace the filamentary fibers, a basis of weight of from 10 g or more to 250 g/m², and a bulk density of 0.20 g/cm³ or more.

5 Claims, 3 Drawing Sheets

U.S. PATENT DOCUMENTS

| | | | |
|---|---|---|---|
| 5,178,932 | A | 1/1993 | Perkins et al. |
| 5,366,792 | A | 11/1994 | Shirayanagi et al. |
| 5,766,737 | A * | 6/1998 | Willey et al. .............. 428/198 |
| 2003/0171054 | A1 | 9/2003 | Banasal |
| 2003/0186612 | A1 | 10/2003 | Goldwasser et al. |

FOREIGN PATENT DOCUMENTS

| | | | |
|---|---|---|---|
| EP | 0 821 092 A2 | | 1/1998 |
| JP | 02-289161 | * | 11/1990 |
| JP | 2-289161 | | 11/1990 |
| JP | 5-179558 | | 7/1993 |
| JP | 6-248511 | | 9/1994 |
| JP | 10-96156 | | 4/1998 |
| JP | 2003-220660 | * | 8/2003 |
| JP | 2003-268667 A1 | | 9/2003 |
| TW | 00369574 B1 | | 9/1999 |
| TW | 00420736 B1 | | 2/2001 |

OTHER PUBLICATIONS

Mehta, Rakesh. Brandrup, J.; Immergut, Edmund H.; Grulke, Eric A.; Abe, Akihiro; Bloch, Daniel R., editors. (1999) Polymer Handbook (4th Edition). (pp. V-131). John Wiley & Sons. Online version available at: http://www.knovel.com/knovel2/Toc.jsp?BookID=1163&VerticalID=0.*

Ward, Ian M.; Coates, Phil D.; Dumoulin, Michel M. (2000) Solid Phase Processing of Polymers. (pp. 90-94). Hanser Publishers. Online version available at: http://www.knovel.com/knovel2/Toc.jsp?BookID=1001&VerticalID=0.*

Steven B. Warner, "Fiber Science", 1995, p. 60.*

JP 06-248511, published Jun. 9, 1994, machine translation.*

* cited by examiner

HIGH TENACITY NONWOVEN FABRIC

TECHNICAL FIELD

The present invention relates to an improved spun-bonded laminated nonwoven fabric excellent in tensile tenacity and having good filtering and barrier properties.

The improved spun-bonded laminated nonwoven fabric of the present invention is a nonwoven fabric excellent in tensile tenacity and having filtering and barrier properties. The laminated nonwoven fabric can be used for various applications that particularly utilize the characteristics of the spun-bonded filamentary fiber nonwoven fabric, for example, building materials such as house wraps, wall materials and roof materials, sound insulation materials and sound absorbing materials, filtering materials such as food filters, air filters, liquid filters, filters for cleaners and membrane substrates, industrial and agricultural materials including filter materials firstly, sanitary and medical treatment materials such as personal protective equipment, disposable diapers, sterilization wraps and medical treatment filters, subsistence stores such as packaging materials, packaging materials for drying agents, packaging materials for body warmers, base materials of adhesive tapes, down pressing, shoe materials, and the like. That is, the laminated nonwoven fabric opens new applications in many fields of utilization.

The improved spun-bonded nonwoven fabric of the present invention is a laminated nonwoven fabric of a spun-bonded fiber layer/a melt-blown fiber layer/a spun-bonded fiber layer. Because the laminated structure is an altered one, the nonwoven fabric is excellent in tensile tenacity and has good filtering and barrier properties. Moreover, because the laminated nonwoven fabric is one prepared from a polyester or polyamide resin material, the nonwoven fabric has a high tenacity, a heat resistance, chemical affinity and hydrophilic properties due to the material properties. Therefore, not only can the functions of the above various final products be made superior in comparison with a polyolefin spun-bonded nonwoven fabric, the degree of freedom in the production steps can be enhanced. Furthermore, field of use for nonwoven fabric can be widened, and a new field of application of the nonwoven fabric, as a nonwoven fabric material, can be newly opened. For example, the nonwoven fabric having a heat resistance in addition to filtering and barrier properties and tensile tenacity can be used in drying and coating steps when used as a base material of a tape or a substrate of a membrane or the like, and it can also used in a field requiring bonding with a heat seal or a hot melt material that must avoid a decrease in material tenacity and material deformation.

DESCRIPTION OF THE RELATED ART

Formation of a nonwoven fabric structure with fine or micro fibers of about 0.01 dtex by flash spinning or melt blowing is favorable to the production of a nonwoven fabric having both filtering and barrier properties.

A flash-spun nonwoven fabric for general purposes is restricted to a nonwoven fabric of polyolefin type such as polyethylene and polypropylene due to the fiber formation. The nonwoven fabric is naturally a nonwoven fabric material having a significantly low heat resistance in comparison with a spun-bonded nonwoven fabric formed out of a polyester or polyamide fiber. A special production installation and a special solvent are essential to commercial production of a nonwoven fabric by flash spinning.

On the other hand, in the production of a nonwoven fabric by melt blow spinning, a nonwoven fabric structure formed out of fine fibers having a fiber diameter of 5 μm or less can be prepared from various resins. The nonwoven fabric is also characterized by its filtering properties and barrier function based on the network structure of the fine fibers. Because the nonwoven fabric structure is formed out of fine fibers, the nonwoven fabric prepared by melt blow spinning has, on the other side, drawbacks as explained below. The nonwoven fabric shows a poor mechanical tenacity such as a tensile tenacity. Moreover, the nonwoven fabric structure is relatively easily deformed and destroyed and, for example, the gaps among the fine fibers are expanded when a solid or a fluid to be filtered penetrates and is passed. For the reasons explained above, it is known that attempts have been made to obtain a laminated filamentary fiber nonwoven fabric that has filtering and barrier properties and that is reinforced with respect to mechanical properties by forming a composite nonwoven fabric structure with a filamentary fiber nonwoven fabric added to the melt-blown nonwoven fabric.

Japanese Unexamined Patent Publication (Kokai) No. 7-207566 discloses a composite nonwoven fabric that is prepared by stacking a melt-blown fine fiber nonwoven fabric and a continuous filamentary fiber nonwoven fabric (=spun-bonded nonwoven fabric) having been prepared in advance, and integrating the stacked structure, and that it is excellent in mechanical tenacity and filtering and barrier properties. The constituent fibers within each nonwoven fabric structure of the stacked fabric are rigidly fixed and have no degree of freedom. As a result, the fine fibers of the stacked melt-blown nonwoven fabric do not spread in the spun-bonded filamentary fiber layer. When the stacked structure is passed through thermal calender rolls or thermal embossing rolls, each nonwoven fabric is given a plurality of thermal histories, and the tensile strength of the nonwoven fabric is further lowered in accordance therewith. Furthermore, because the melt-blown nonwoven fabric having a low basis of weight is easily deformed significantly, and its handling is complicated, the fine structure is likely to be elongated in the course of preparing and processing the stacked structure, and a uniform layer is hardly formed.

Japanese Unexamined Patent Publication (Kokai) No. 2-289161 discloses a method of producing a composite nonwoven fabric having good filtering properties, comprising collecting a deposited web of extremely fine fibers directly spun by melt blow spinning on the upper face of a filamentary fiber nonwoven fabric to form stacked sheets, and compressively bonding the stacked sheets without heating. Moreover, Japanese Unexamined Patent Publication (Kokai) No. 2-112458 discloses a method of producing a sanitary material agreeable to the touch by a similar procedure. Because the structure of the spun-bonded filamentary fiber layer is fixed in advance in the composite nonwoven fabric, the following cannot be expected: melt-blown fine fibers are substantially intruded in the interior of the filamentary fiber layer and the filamentary fibers are intertwined therewith; and the anchoring effects of the intruded fine fibers impart resistance to layer peelability to the laminated structure.

Japanese Unexamined Patent Publication (Kokai) No. 2-88056 discloses a method comprising placing an extremely fine fiber nonwoven fabric on the sheet-like web of filamentary fibers deposited on a collecting face, further additionally arranging a spun-bonded nonwoven fabric on the extremely fine fiber nonwoven fabric, and processing the stacked fabrics between rolls and thermocompressive bonding them with emboss rolls to effect layer-to-layer bonding of the stacked fabrics. Because the nonwoven fabric structure of the melt-blown nonwoven fabric to be used as a bonding layer is fixed in advance, no intrusion of the melt-blown fine fibers into the filamentary fiber layer of the spun-bonded nonwoven fabric takes place. As a result, no anchoring effects are exhibited, and the expected thermocompressive bonding effects of the fine fibers cannot be obtained.

Japanese Examined Patent Publication (Kokoku) No. 60-1148 similarly discloses a method of fixing a stacked nonwoven fabric structure in the production of a polyolefin filamentary fiber nonwoven fabric, comprising supplying a melt-blown extremely fine fiber nonwoven fabric having been prepared and wound around an unwinding source in advance to a bare face of a filamentary fiber web (termed spun-bonded web) deposited on a transfer collecting net face to form a stacked structure, and thermocompressively bonding the stacked nonwoven fabric structure with thermal emboss rolls. In the known method, the function of the fine fibers forming the melt-blown nonwoven fabric as a layer-to-layer bonding agent for the spun-bonded filamentary fiber layers is suggested. However, the melt-blown nonwoven fabric to be applied as a bonding layer is a material in which the nonwoven fabric structure is fixed in advance. Accordingly, substantial intrusion of the melt-blown fine fibers into the filamentary fiber layer of the spun-bonded nonwoven fabric and the reinforcing function of the former fibers cannot be expected.

DISCLOSURE OF THE INVENTION

An object of the present invention is to provide a spun-bonded laminated nonwoven fabric excellent in tensile tenacity, having filtering and barrier functions, and showing significant firmness with respect to the fine fiber layer structure and a high tensile tenacity due to significant mutual reinforcement of the fine fiber layer and the filamentary fiber layer produced by the intrusion to a high degree of the fine fiber layer of the nonwoven fabric structure into the filamentary fiber layer.

A more specific object of the present invention is to provide a high tenacity nonwoven fabric composed of a spun-bonded laminated nonwoven fabric having a nonwoven fabric structure formed by stacking and integrating a fine fiber nonwoven fabric layer that has a stabilized structure maintaining filtering and barrier properties and filamentary fiber layers that are to be structurally reinforced with the fine fibers and that are arranged on both sides of the fine fiber layer, respectively.

A still another object of the present invention is to provide a spun-bonded high tenacity nonwoven fabric of polyester fiber type or polyamide fiber type having, in addition to a firm structure of the fine fiber layer and a high tensile tenacity of the laminated nonwoven fabric, a high tenacity, a heat resistance, a chemical affinity, hydrophilic properties, and the like, due to the polyester or polyamide fiber material, the nonwoven fabric of polyester fiber type being further excellent in radiation resistance and dimension stability, and the nonwoven fabric of polyamide type being further excellent in swelling resistance to oil and in dye affinity.

A still another object of the present invention is to provide a further stabilized method of producing a spun-bonded high tenacity nonwoven fabric which is excellent in the tensile tenacity and fluff formation resistance, which has filtering and barrier functions and in which the nonwoven fabric structure is reinforced and stabilized.

As a result of investigating the correlation between the states of intertwining and intimate mixing of fine fibers in filamentary fiber layers arranged on both sides of the fine fiber nonwoven fabric layer while being contacted with both sides, respectively, and the principal properties such as tensile tenacity of the laminated nonwoven fabric, the present inventors have found that there is a significant positive correlation between the intimate mixing (=intrusion) of the melt-blown fine fibers in the interior of the filamentary fiber web layer and properties of the laminated nonwoven fabric such as a tensile strength, a tear strength, a 5% modulus, a fluff formation resistance and a layer-to-layer peel tenacity. That is, the present inventors have discovered that the tensile tenacity of the laminated nonwoven fabric is more significantly improved when the intrusion and intimate mixing of the melt-blown fine fibers in the interior of the filamentary fiber web layer proceed more, and the idea of the present invention has thus been acquired.

Figure 1:
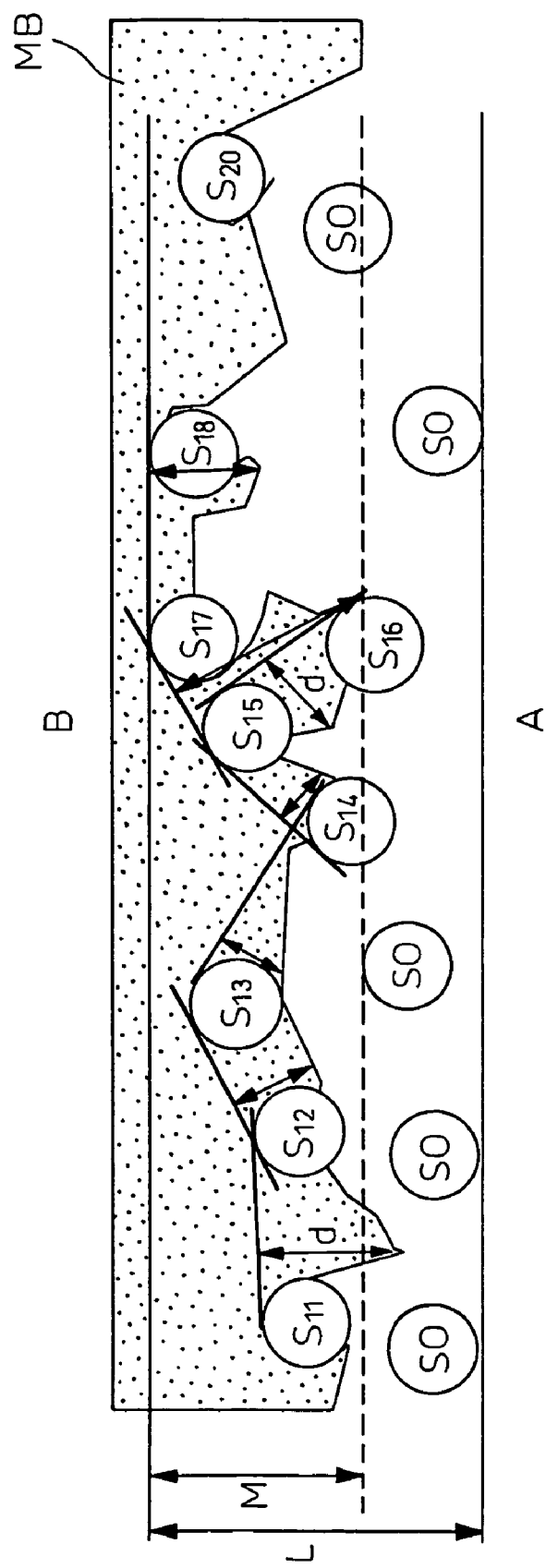
FIG. 1 is a view of a cross section in the CD direction (weft) of an improved spun-bonded laminated nonwoven fabric of the present invention, schematically illustrating a laminated nonwoven fabric structure including a fine fiber intimate mixed layer that is formed by intrusion of the melt-blown fine fibers toward the interior of the filamentary fiber layer.
Figure 2:
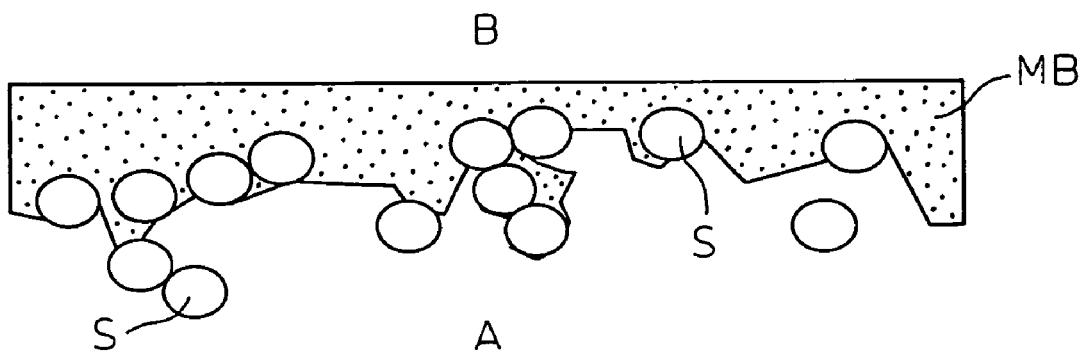
FIG. 2 is a view schematically showing the laminated cross-sectional structure of a spun-bonded laminated nonwoven fabric of the present invention.
Figure 3:
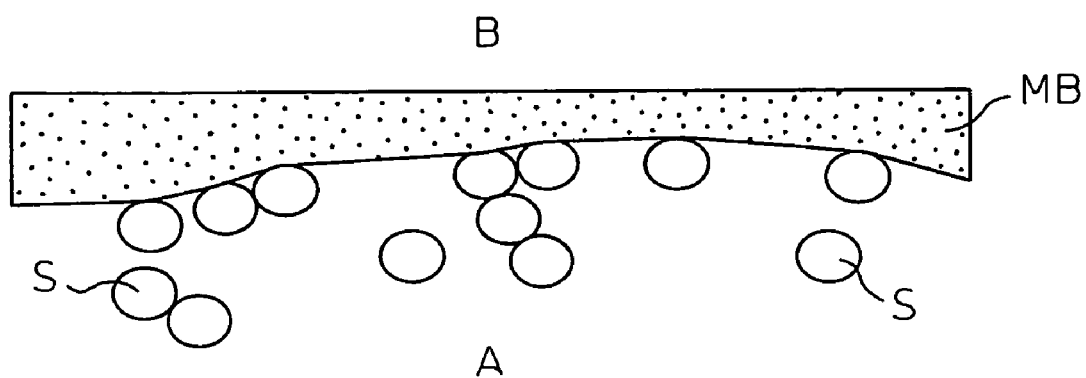
FIG. 3 is a view schematically showing the laminated cross-sectional structure of a spun-bonded laminated nonwoven fabric of a comparative example.

The spun-bonded nonwoven fabric of the present invention is a high tenacity nonwoven fabric wherein the nonwoven fabric is a laminated one formed by integrating, through compressive bonding, three stacked layers comprising an upper and a lower thermoplastic synthetic filamentary fiber layer having a fiber diameter from 7 µm or more to 20 µm, and an intermediate layer composed of a thermoplastic synthetic fine fiber layer having a fiber diameter of 5 µm or less, the laminated nonwoven fabric having an intimately mixed nonwoven fabric layer structure in which a portion of the fine fibers is intruded into at least one face side of the filamentary fiber layers with an intrusion index of 0.36 or more, a basis of weight of from 10 g or more to 250 g/m$^2$, and a bulk density of 0.20 g/cm$^3$ or more.

The spun-bonded laminated nonwoven fabric of the present invention can be prepared by the steps of:

spinning filamentary fibers, in at least one layer, of a thermoplastic fiber-forming synthetic polymer on a collecting conveyor, blowing fine fibers, having a crystallinity from 15% or more to 40% or less, of a thermoplastic synthetic resin in at least one layer by melt blowing, onto the filamentary fibers, placing filamentary fibers in at least one layer, on the fine fiber layer, and integrating the stacked fiber layers by thermocompressive bonding with emboss rolls or flat rolls at thermocompressive bonding temperature from 10 to 80° C. below the melting point of the filamentary fibers at a line pressure from 100 to 1,000 N/cm.

A nonwoven fabric of the present invention excellent in tensile tenacity, and having filtering and barrier functions and a method of producing the same will be explained in detail.

The spun-bonded laminated nonwoven fabric of the invention is formed by integrating a so-called stacked SMS web having an arrangement in which a melt-blown fine fiber web (MW) sheet of thermoplastic synthetic fibers is held between so-called filamentary fiber web (SW) sheets of thermoplastic synthetic fibers, in such a manner that the fiber-to-fiber and layer-to-layer structures are integrated by thermocompressive bonding action. The spun-bonded laminated nonwoven fabric has a fixed three-layer nonwoven fabric structure in which the melt-blown fine fibers are intruded into a continuous filamentary fiber layer to a high degree with a specific intrusion index.

The structure of the spun-bonded laminated nonwoven fabric of the invention is formed as follows: in the production process of a spun-bonded filamentary fiber nonwoven fabric, a first deposited filamentary fiber web (SW1) of a group of many continuous filamentary fibers is melt spun on a moving collector face; a melt-blown fine fiber web (MW) layer is directly blown on the entire face of the first web; a second web (SW2) of a group of many continuous filamentary fibers is further deposited on the entire face of the melt-blown fine fiber web layer, whereby the above sheet-like stacked SMS web as a whole is formed; and the stacked web is integrated during the step of thermocompressively bonding the melt-blown fine fiber web (WEB) layer in a sandwiched form, whereby a laminated three-layer nonwoven fabric structure in which the melt-blown fine fibers as a whole are intruded into the continuous filamentary fiber layers to a high degree with a specific intrusion index is formed.

The spun-bonded laminated nonwoven fabric of the present invention has a structure wherein the melt-blown fine fiber structure is intruded into the continuous filamentary fiber layers to a high degree with a specific intrusion index, and the melt-blown fine fiber layer and the filamentary fiber layers are mutually reinforced to a high degree on the basis of the laminated three-layer nonwoven fabric structure. As a result, the tensile tenacity of the spun-bonded laminated nonwoven fabric has been successfully and significantly increased while the laminated nonwoven fabric is made to have the following advantages: the fine fiber layer structure is firm; the nonwoven fabric has filtering and barrier properties produced by the melt-blown fine fibers, and it maintains a constant fluff formation resistance.

FIG. 1 is a schematic view showing a cross-sectional structure in the CD direction of a spun-bonded laminated nonwoven fabric of the present invention. FIG. 1 is a cross-sectional view showing a structure in which a continuous filamentary fiber layer, a melt-blown fine fiber web and a filamentary fiber web (not shown in the figure, placed on the spinning nozzle side face of the web) are stacked in this order, and integrated.

As shown in FIG. 1, the laminated three-layer nonwoven fabric structure in the present invention comprises a filamentary fiber layer (L) formed by spun bonding, a melt-blown fine fiber layer (MB) and another filamentary fiber layer (not shown) further placed on the spinning nozzle side. The filamentary fiber layer (L) formed by spun bonding contains on the spinning nozzle side an intimate mixing layer (M) of filamentary fibers ($S_1$-$S_n$) and melt-blown fine fibers that is formed by the intrusion of the melt-blown fine fibers. In addition, the filamentary fiber layer (L) also contains a layer not including melt-blown fine fibers and composed of filamentary fibers (SO). In the figure, the nozzle face side is designated by A, and the collecting face side is designated by B.

In FIG. 1, the portion shown with half-tone dot meshing is the fine fiber layer, and round cross sections are those of filamentary fibers. The types of intrusion of a fine fiber layer are classified as follows: filamentary fibers are completely surrounded as illustrated by $S_{13}$ and $S_{15}$; at least a half of the cross section of filamentary fiber is surrounded as illustrated by $S_{11}$ and $S_{12}$; part of the cross section of a filamentary fiber is adhesive bonded as illustrated by $S_{14}$ and $S_{16}$. The degree of intrusion of fine fibers into the filamentary fiber layer, that of bonding of fine fibers to the filamentary fiber layer and that of surrounding of a filamentary fiber with fine fibers can be evaluated with an intrusion index to be described later. It can be said that the intrusion index increases with a degree of intrusion of fine fibers into filamentary fiber layers, and a degree of surrounding of filamentary fibers with fine fibers.

The fine fibers thus intruded are intruded into gaps among fibers of the filamentary fiber layer while maintaining a gathered state, not a filmy state but a fibrous state, and act to embed in gaps among fibers of the filamentary fiber layer. Because the phenomenon acts to reinforce the filamentary fiber layer and at the same time embed in the gaps among filamentary fibers, it can impart various shielding effects and separating functions to improve a filtering function and a barrier function.

Furthermore, reinforcement and fixation of fibers of the filamentary fiber layer in such a special shape results in firmly fixing the filamentary fibers, and making the laminated nonwoven fabric excellent in wear resistance, and contribute to the improvement of a surface fluff formation resistance.

Such a specific structure of the invention is distributed and present over the entire face of the non-compressively bonded portion other than the thermocompressively bonded portion after integration by partial thermocompressive bonding with emboss rolls. Moreover, when the stacked structure is integrated by partial thermocompressive bonding with emboss rolls, such a specific effect of the invention is distributed over the entire face of non-compressively bonded portions excluding thermocompressively bonded portions. When the stacked structure is integrated by heating and compressing with flat rolls, no thermal melt bonding takes place, and the structure is present over the entire face.

In the present invention, the intrusion index of the melt-blown fine fibers is expressed by the following formula (1):

$$\text{intrusion index} = d/D \quad (1)$$

wherein d is an average of depth of a melt-blown fine fiber phase that embeds in a gap between two adjacent filamentary fibers (provided that the distance between the two fibers does not exceed three times the diameter) measured according to the method to be explained later, and D is the diameter of the filamentary fibers.

That is, the intrusion index represents a degree of intimate mixing in terms of a filling degree of melt-blown fine fibers occupying filamentary fibers forming the filamentary fiber layer. The laminated three-layer nonwoven fabric of the invention is, therefore, characterized by the laminated nonwoven fabric structure including a filamentary fiber layer with which the melt-blown fine fibers are intimately mixed at a filling degree specified by an intrusion degree of the melt-blown fine fibers.

In the present invention, the laminated nonwoven fabric has a structure in which the melt-blown fine fibers are intimately mixed with the continuous filamentary fibers when the melt-blown fine fibers are intruded into the continuous filamentary fibers at an intrusion index of 0.36 or more. The intrusion index is more preferably 0.4 or more. Although a continuous filamentary fiber web is further placed on the melt-blown fine fiber layer, the melt-blown fine fibers intrude less in this direction.

Calculation of an intrusion index is carried out while portions that are embossed during thermocompressive bonding are being excluded. Thermally embossed portions are excluded from objects the intrusion index of which is to be evaluated, for the following reasons. It is concluded from electron microscopic observation of thermocompressively bonded embossed portions that fine fibers and filamentary fibers in the portions are mostly melted or fused under high pressure, and the fiber structure is destroyed. As a result, determination of a degree of intimate mixing of both types of fibers from observation of the cross-sectional shape of the portions is difficult.

In the present invention, the fiber diameter of the continuous filamentary fibers forming the spun-bonded filamentary fiber layer is 7 μm (0.53 dtex for PET, 0.42 dtex for Ny6) or more, preferably 12 μm or more in view of the covering properties and mechanical strength the filamentary fiber layer is required to have, and the spinning stability in the production process of spun-bonded fibers. Moreover, the upper limit is 20 μm or less. Because the continuous filamentary fiber layer is a web deposition layer of a continuous filamentary fiber group deposited on a transfer collecting conveyor, the layer has a nonwoven fabric structure prepared from a filamentary fiber web layer in which the filamentary fibers are uniformly dispersed within the web through friction charging, corona charging or mechanical filament dispersion means in a known spun bond spinning process. The continuous filamentary fiber layer may be a single layer, or it may also be a plurality of stacked layers. In addition, methods of preparing continuous filamentary fiber webs are disclosed in many known references such as Japanese Examined Patent Publication (Kokoku) Nos. 60-11148 and 48-38025.

For the melt-blown fine fiber layer, the average fiber diameter is from 0.5 μm or more to 5 μm or less, preferably 3 μm or less. The melt-blown fine fiber layer can be easily prepared by methods and with apparatuses described in many known references such as Ind. Eng. Chem. 48, vol. 8, 1342-1346 and Japanese Examined Patent Publication (Kokoku) No. 56-33511. When the fiber diameter of fine fibers prepared by melt blow spinning becomes less than 0.5 μm, the spinning conditions unpreferably become too severe, and are not stabilized. When the fiber diameter of the fine fibers is larger than 5 μm, it becomes close to that of the continuous filamentary fibers. As a result, not only manifestation of the filtering and barrier properties by the fine fibers becomes ineffective, but also formation of an intimately mixed layer produced by the intrusion of the fine fibers into the continuous filamentary fiber layer becomes difficult. In the intrusion of the melt-blown fine fibers, because the fiber diameter is preferably about 1/5 or less of the diameter of the continuous filamentary fibers, it is preferably 3 μm or less. An intimately mixed layer having an intrusion index of 0.36 or more mentioned above can be formed by directly blowing the melt-blown fine fibers through melt blow spinning onto the upper face of the above-explained continuous filamentary fiber web in an unbonded state. Fixing of a nonwoven fabric structure formed by thermocompressive bonding can be surely and stably conducted by adjusting the crystallinity of the melt-blown fine fibers, that have been blown, to from 15% or more to 40% or less.

When the crystallinity is 15% or less, the softening point becomes excessively low, and the melt-blown fine fibers bleed out from the filamentary fiber layer, or they are exposed from gaps of the filamentary fiber layer during integration with thermocompressive bonding rolls. As a result, the melt-blown fine fibers adhere to the thermocompressive bonding rolls, or become a film or a molten lump in the embossed portions, or they are bonded to the rolls to hinder stabilized production of the laminated nonwoven fabric. On the other hand, when the crystallinity is 40% or more, the bonding strength between the melt-blown fine fibers and the continuous filamentary fibers is lowered, and the intrusion of the melt-blown fine fibers into the filamentary fibers is decreased. As a result, layer-to-layer peeling of the laminated layers takes place, and a manifestation of the strength of the laminated nonwoven fabric is suppressed.

The melt-blown fine fibers can be deposited as a single layer, or they can be deposited by stacking a plurality of layers thereof. However, because the intimately mixed layer is formed by a first layer of the melt-blown fine fibers directly blown onto the filamentary fiber layer, a smaller average diameter of the first layer preferably makes the intrusion index larger.

For the laminated three-layer nonwoven fabric structure that satisfies the intrusion index specified by the present invention, it is a fundamental principle to form a melt-blown fine fiber layer by directly blowing a melt-blown fine fiber web (MW) over the entire face of a deposited web (SW1) of a group of many continuous filamentary fibers melt spun onto the face of collector being transferred in the production process of the spun-bonded filamentary fiber nonwoven fabric. A web (SW2) of a group of many continuous filamentary fibers that are melt spun is further deposited.

In the present invention, the spinning speed is determined while manifestation of adequate tenacity produced by drawing the continuous filamentary fibers and the dimensional stability are being taken into consideration. For example, a polyethylene terephthalate is drawn and spun at a spinning speed of 3,000 m/min or more, preferably 3,500 m/min or more. A so-called SMS structure wherein a melt-blown fine fiber layer is directly blown on a filamentary fiber web, and a filamentary fiber web is further placed on the melt-blown fine fiber layer is formed. When a so-called SM structure is selected, heating rolls are directly contacted with the melt-blown layer under thermocompressive bonding conditions of integrating the stacked structure to such a degree that the filamentary fiber layer web comes to have tenacity due to bonding produced to some extent in the filamentary fiber layer web, and the melt-blown fine fibers are softened or melted. As a result, the fine fibers themselves are destroyed or deformed, and the network fiber structure is likely to be lost. Moreover, the melt-blown fiber layer tends to be taken up by the thermocompressive bonding rolls, and stabilized production becomes difficult. The SMS structure is therefore selected in the present invention, and the melt-blown fine fibers are not directly contacted with the heating rolls. As a result, the melt-blown fine fibers are intruded into the continuous filamentary fibers and bonded thereto to realize thermocompressive bonding under the conditions of manifesting the tenacity of the continuous filamentary fiber layer.

The intrusion index can be adjusted by either a method comprising setting a relative distance between melt blow spinning nozzles that spin the melt-blown fine fibers and the collecting face of the deposited web of the continuous filamentary fibers at about 12 cm, or a method comprising increasing the absorbing force that acts on the collecting face. The intrusion index unexpectedly changes in accordance with the type of a resin material that forms the melt-blown fine fibers. It has been found that a nonwoven fabric having a larger intrusion index can be more easily prepared when a thermoplastic resin having a melting point of 180° C. or more, such as a polyamide resin or a polyethylene terephthalate resin, is used than when a polyolefin resin is used.

Specific forms of the intrusion of the melt-blown fine fibers are explained below. The intrusion of the melt-blown fine fibers that have been blown is not in the following form: one or two filaments of the melt-blown fine fibers are singly in a whisker or intertwining form at a site. A larger number of the filaments, namely, an aggregation of a plurality of filaments, produces a layer which forms an intruded portion; the intruded layer takes an arranged form wherein the intruded layer surrounds part of or the whole of the filamentary fibers to enclose them, or the intruded layer is interlaced therewith. Moreover, a structure in which part of the intruded melt-blown fine fibers are bonded to filamentary fibers is formed at a boundary of an intimately mixed layer of the melt-blown layer and the filamentary fiber layer onto which the melt-blown fine fibers are blown. The fine fibers must be melt blown in such an amount that does not destroy the melt-blown layer structure manifesting filtering and barrier properties produced by the melt-blown fine fibers. The melt-blown fine fiber ratio is preferably 10% by weight or more, or a basis of weight of 2 $g/m^2$ or more.

The intrusion index is manifested by a degree of freedom on the filamentary fiber side under spinning conditions, fiber properties produced by a low crystallinity of the melt-blown fine fibers, the intrusion force of melt blowing, and further intrusion produced by heating and compression with the flat rolls.

Fixing of the stacked three-layer nonwoven fabric structure by thermocompressive bonding can be carried out by applying thermal embossing to the nonwoven fabric surface in 50% or less of the surface area, or applying thermal calendering over the entire face of the stacked three-layer web.

Although the emboss pattern does not have much influence, use of an emboss pattern that has a small tip area and recesses and protrusions with drastic and significant forcing and that may incur the damage of the melt-blown fine fiber layer should desirably be avoided. An emboss area that is less than 6% of the total surface area is unpreferable, because an adequate fabric tenacity cannot be obtained by thermocompressive bonding. An emboss area that is greater than 50% of the total surface area is unpreferable, because partial non-compressive bonded portion is decreased, and portions through which fluid can pass are likely to decrease. Integration by thermal compression with flat rolls may also be conducted as long as the resultant laminated nonwoven fabric has filtering and barrier properties suited to the use.

The thermocompressive bonding temperature is selected from a temperature range from the melting point of the thermoplastic resin forming the continuous filamentary fibers minus about 80° C. to the melting point minus 20° C. The line pressure is selected from a range from 100 N/cm or more to 1,000 N/cm or less. However, when the pressure and temperature are low, neither bonding among the continuous filamentary fibers themselves nor bonding among the filamentary fibers caused by softening of the melt-blown fine fibers takes place. As a result, layer-to-layer peeling easily takes place, and the continuous filamentary fibers are peeled in a cotton-like form. A nonwoven fabric structure that manifests adequate fabric strength therefore cannot be obtained. When a laminated nonwoven fabric that hardly shows layer-to-layer peeling, that has a suitable strength and that can be easily handled as a fabric is desired, suitable selection of thermocompressive bonding conditions that make the nonwoven fabric structure have a fluff index of about grade 2.5 or more is preferred. Conversely, when the temperature is excessively high and the pressure is high, the fine fibers are melted, or the melt-blown fine fibers bleed out to the outside of the filamentary fiber layer to stick to the heating rolls. Accordingly, in determining the thermocompressive bonding conditions, amounts of the melt-blown fine fibers and the continuous filamentary fiber layer, a degree of intrusion, a fiber diameter of the continuous filamentary fiber layer, a dispersion, and the like must be taken into consideration.

The basis of weight of a spun-bonded laminated nonwoven fabric of the invention is generally selected from a range from 10 $g/m^2$ or more to 250 $g/m^2$ or less. When the basis of weight is less than 10 $g/m^2$, the laminated nonwoven fabric has a tenacity insufficient for use in various applications. When the basis of weight of the filamentary fiber layer is less than 5 $g/m^2$, the melt-blown fine fibers excessively pierce through the continuous filamentary fiber web to deteriorate the feeling after thermocompressive bonding, or the structure of the fine fiber layer is likely to be destroyed. During the production of the laminated nonwoven fabric, the filamentary fiber web cuts into the collecting face, and the melt-blown fine fibers tend to melt stick to the emboss rolls. Stabilized production of the laminated nonwoven fabric therefore becomes difficult. When the basis of weight exceeds 250 $g/m^2$, the thickness of the laminated nonwoven fabric increases, and the melt-blown fine fibers hardly reach the surface layer of the filamentary fiber layer even if the degree of intrusion is enhanced by increasing an amount of the melt-blown fine fibers. As a result, the effects of intrusion of the melt-blown fine fibers cannot be obtained efficiently.

The ratio of a weight of the melt-blown fine fiber layer per unit area to a total basis of weight of the laminated nonwoven fabric can be determined by taking the fiber diameter of the melt-blown fine fibers into consideration so that the barrier and filtering properties of the product nonwoven fabric become satisfactory. When the ratio is too small, the layer structure of the fine fibers cannot be maintained during the intrusion of the fine fibers for reasons explained above, and the barriering and filtering properties become poor. Moreover, when the ratio exceeds 50%, an amount of the melt-blown fine fibers that are softened during thermocompressive bonding becomes excessive, and the melt-blown fine fibers are excessively intruded into the continuous filamentary fiber layer. The use of such a ratio therefore has the following drawbacks: the melt-blown fine fibers are exposed to the surface of the continuous filamentary fiber layer that is the outermost layer; the melt-blown fibers are similarly exposed to the surface in the embossed portion; softened melt-blown fine fibers become resinous, are taken up by the emboss rolls, and make the surface and the embossed portions of the laminated nonwoven fabric product have a significantly hard feeling; moreover, the tensile tenacity per basis of weight of the laminated nonwoven fabric decreases in accordance with a decrement of the fraction of the continuous filamentary fibers than the bonding effects of the melt-blown fine fibers. The use of this ratio is therefore unpreferred.

The continuous filamentary fibers and the melt-blown fine fibers forming the spun-bonded laminated nonwoven fabric of the invention are prepared from a fiber-forming thermoplastic synthetic resin that is prepared from a fiber-forming raw material. The fiber-forming thermoplastic synthetic resin is composed of the melt-blown fine fibers and the continuous filamentary fibers that are composed of a thermoplastic resin. The thermoplastic resin is composed of a polyester or its copolymer, or a mixture of the polyester and the copolymer. Examples of the thermoplastic resin include a polyethylene terephthalate, a polybutylene terephthalate, polytrimethylene terephthalate, and a polymer prepared by polymerizing an aromatic dicarboxylic acid such as terephthalic acid, isophthalic acid, phthalic acid or naphthalenedicarboxylic acid and a diol such as ethylene glycol, diethylene glycol, 1,4-butanediol or cyclohexanedimethanol. The above polyester may also be a biodegradable resin such as a polylactic acid or an aliphatic polyester.

A polyolefin, a polyamide or a polyurethane may also be added to the thermoplastic resin to such an extent that the effects of the invention are not marred. Similarly, optional additives such as pigment, titanium oxide, a UV absorber, a thermal stabilizer and an anti-oxidizing agent may also be added to such an extent that the effects of the invention are not marred.

Furthermore, examples of the thermoplastic resin may also include a polyamide such as a nylon 6, a nylon 66, a nylon 610 or a nylon 612, or the examples may also include a copolymer or a mixture of these polymers.

A polymer such as a polyolefin, a polyester or a polyurethane may also be added to such a thermoplastic resin to such an extent that the effects of the invention are not marred. Similarly, optional additives such as pigment, titanium oxide, a UV absorber, a thermal stabilizer or an anti-oxidizing agent may also be added to such an extent that the effects of the invention are not marred.

A polyolefin that is herein added may be a polyethylene, a polypropylene homopolymer or a polypropylene prepared by randomly copolymerizing an α-olefin and ethylene, or a mixture of these polymers.

In addition, in the present invention, it is preferred that the continuous filamentary fibers and the melt-blown fine fibers be both formed out of resin material of the same type, in view of improvement of the manifestation of the bonding strength during integration by thermocompressive bonding.

The following procedures decrease a degree of freedom of the continuous filamentary fiber web that is supplied to be placed on the melt-blown fine fibers: smoothing the surface layer of the web with preheating rolls and smoothing rolls in order to prevent web turning up during blowing melt-blown fine fibers; and weakening the repulsion among fibers by removing the static electricity; absorbing the web toward the conveyor face. However, the degree of freedom must be such that, during directly spinning the melt-blown fine fibers, the filaments of the continuous filamentary fibers move to allow the intrusion of the melt-blown fine fibers into the continuous filamentary fibers (structure formation). Moreover, the following spinning conditions of the melt-blown fine fibers are selected: a fiber diameter and a discharging amount of the melt-blown fine fibers; a fiber diameter and a weight and a dispersion per unit area of the continuous filamentary fibers; a speed of a drawing and heating fluid for imparting an intrusion force; a distance between the nozzles and a conveyor face on which the continuous filamentary fibers are placed; an air blowing angle; an absorbing air speed in a portion where the melt-blown fine fibers land; and the like. Conditions related to bonding among the melt-blown fine fibers or among the melt-blown fine fibers and the continuous filamentary fibers are selected while temperature conditions of sticky melt-blown spun yarns at a time when the melt-blown fine fibers are collected, and a distance from the nozzles to the conveyor face are also taken into consideration.

The crystallinity of the melt-blown fine fibers influences not only the above operational problems but also the intrusion. When the crystallinity exceeds 40%, the melt-blown fine fibers have the following disadvantages: the bondability and intrudability are lowered; the flexibility is decreased, and the intrusion is hardly manifested during blowing; the melt-blown fine fiber layer is hardly softened during thermocompressive bonding, and the intrusion by transferring is hardly manifested.

As to making the crystallinity of the melt-blown fine fibers fall into a given range, when the solution viscosity $\eta_{sp}/c$ of a polyester resin is from 0.2 to 0.8, preferably from 0.2 to 0.5, the crystallinity can be adjusted under a conventional met blow spinning conditions. Moreover, when the solution viscosity $\eta_{sp}/c$ of a polyamide is from 1.8 to 2.7, preferably from 1.8 to 2.2, the crystallinity can be similarly adjusted. The crystallinity of the melt-blown fine fibers of a conventional polypropylene subsequent to spinning is about 50%, which is high in comparison with a polyester and a polyamide. The results can be considered to be due to the effect exerted during cooling. A resin material having a higher melting point is considered to be softened and manifest the intrusion more easily.

BEST MODE FOR CARRYING OUT THE INVENTION

Examples

Examples of the present invention will be explained below. However, the present invention is in no way restricted thereto.

Specific properties referred to in examples and comparative Examples were obtained by the procedures described below.

(1) Measurements of Diameter (>m) of Fibers (Fiber Diameter)

Both ends, each 10 cm long, of a sample such as a fiber web and a nonwoven fabric are removed. A test piece, 1 cm×1 cm, is cut out from each region 20 cm wide of the fabric. The fiber diameter at 30 points of each test piece is measured with a microscope, and the average value of the measured values is calculated (numerical value beyond the first place of decimals being rounded). The average value is defined as the fiber diameter of the constituent fibers of the sample.

Apparatus used: VT-8000 (trade name, manufactured by KEYENCE Co., Ltd.)

Magnification in measurements: 1,000× for continuous filamentary fibers, and 2,500× for melt-blown fine fibers (2) Measurements of Fluff Grade (Fluff Formation Resistance) [Grade] of Nonwoven Fabric The following measurement method has been devised in accordance with the friction fastness test method by JIS L 0849, and used.

Both ends, each 10 cm long, of a nonwoven fabric sample are removed. A test piece 300 mm long in the MD direction and 25 mm wide per 20 cm width of the sample is taken. Using a fastness-testing machine (Nihon Gakujutsu Shinkokai type), a cloth adhesive tape for cloth single packaging (No. 314, manufactured by Rinrei Co., Ltd.) that is thought to have a friction coefficient similar to the human skin is attached to the friction probe side (load of 200 g). The friction probe is made to perform 50 reciprocating movements on the face side of the filamentary fiber layer on the intrusion side of the melt-blown fine fibers of the test piece to effect rubbing the face side. The fluff formation resistance of the rubbed face of each test piece is graded. The average (numerical value beyond the first place of decimals being rounded) of grade values is determined, and defined as the grade of the fluff of the nonwoven fabric.

Grade 1: Fibers are peeled off to such an extent that the test piece is damaged and teared off.

Grade 2: Fibers are peeled off to such a significant extent that the test piece becomes thin.

Grade 2.5: Large pills are clearly observed, and fibers at a plurality of sites begin to rise.

Grade 3: An obvious pill begins to form, or a plurality of small pills are observed.

Grade 3.5: Fluff is formed to such an extent that a small pill begins to form at one site.

Grade 4: No fluff formation is observed.

(3) Measurements of Tear Tenacity [N]

Both ends, each 10 cm long, of a nonwoven fabric sample are removed, and a test piece, 65 mm (longitudinal)×100 mm (cross), in the MD direction, and a test piece, 65 mm (longitudinal)×100 mm (cross), in the CD direction per 20 cm width are sampled. The tear tenacity of each test piece is measured with an Elemendorf type tear tester in accordance with JIS L1085 5.5 C (pendulum method). The average of the measured values is calculated (numerical value in the first place of decimals being rounded). In addition, a measured data in the MD direction designates a value obtained when the nonwoven fabric is torn in the MD direction.

(4) Measurements of Tensile Tenacity [N/3 cm] of Nonwoven Fabric

Both ends, each 10 cm long, of a nonwoven fabric are removed, and a test piece, 3 cm×about 20 cm, in the MD direction and a test piece, 3 cm×about 20 cm, in the CD direction per 20 cm width are sampled. Each test piece is attached to a tensile testing machine (constant rate stretching type) with a grip length of 10 cm, and the load is increased at a tensile rate of 30 cm/min until the test piece is broken. The average of tenacities at maximum loads of the test pieces in the MD direction and that in the CD direction are determined (numerical value in terms of N unit in the first place of decimals being rounded).

(5) Measurements of Air Permeability [ml/cm$^2$/sec] of Nonwoven Fabric

Measurements are made in accordance with JIS L 1096 (Fragile method). Both ends each 10 cm long of a nonwoven fabric are removed, and a sample per 20 cm width is taken. Measurements are made, and the average (numerical value beyond the first place of decimals being rounded) of the measured values is calculated.

(6) Method of Observing Intrusion State of Melt-Blown Fine Fibers

Both ends, each 10 cm long, of a nonwoven fabric are removed, and a sample 1 cm wide is taken at one selected site per 20 cm fabric width. The sample impregnated with ethanol is frozen with liquid nitrogen, and cut in the CD direction. The cut cross section thus obtained is coated with Pt—Pd by vapor deposition at 0.1 torr, 4.2 mA with IB-5 Type Ion Coater (trade name, manufactured by Eiko Engineering Co., Ltd.), and the coated cross section is observed under a magnification of about 500× using a FESEM (model S-4100, manufactured by Hitachi, Ltd.).

(7) Measurements and Calculation of Intrusion Index [–]

The intrusion index represents a degree of intrusion of melt-blown fine fibers into a filamentary fiber layer of a laminated nonwoven fabric. When the intrusion index is larger, the level of the intimate mixing (intrusion) of the melt-blown fine fibers in the filamentary fiber layer is judged to be higher.

The state of intrusion of the melt-blown fine fibers into the filamentary fiber layer is observed as explained below. A cut cross section in the CD direction of a laminated nonwoven fabric sample is prepared under the same conditions as in (6) except that the cross section is not subjected to vapor deposition. A magnified image (about 1,500×) of the cut cross section is recorded using Microscope VT-8000 (manufactured by KEYENCE Co., Ltd.) under light projection conditions (refer to Note). The state of intrusion of the melt-blown fine fiber layer into the filamentary fiber layer is discriminated (refer to FIG. 1)

a. The embossed portion of the nonwoven fabric, where the fabric is thermocompressively bonded and integrated with emboss rolls and intrusion of a fine fiber layer into a filamentary fiber layer cannot be discriminated, is excluded from the portions of the nonwoven fabric where measurements and calculation of intrusion indexes are to be performed. In general, an interface between a fine fiber layer (M) and a filamentary fiber layer in a portion where fine fibers are not intruded cannot be definitely specified. Accordingly, combinations of two adjacent filamentary fibers (S11, S12; S12, S13; - - - S15, S16; - - -) which form the filamentary fiber layer and between which fine fiber layer is included are extracted. However, a distance between the two filamentary fibers thus extracted should not exceed three times the diameter of the filamentary fibers. A tangential line of the two filamentary fibers of each combination thus extracted is drawn on the side opposite to the collecting face.

b. Each tangential line is used as a reference line, and a distance from the reference line to a part most apart from the reference line of the fine fiber layer intruded between the two filamentary fibers is determined and defined as an intrusion depth ($d_1$, $d_2$, $d_3$, - - - $d_{15}$) (refer to FIG. 1). Fifteen pairs of filamentary fibers per cross section are extracted, and the intrusion depth of each pair is measured. The average of the intrusion depths is determined in the width direction, and defined as the average (d)(μm) of the intrusion depths of the fine fibers (each depth being between the corresponding pair of filamentary fibers). However, in order to prevent the intrusion depth of fine fibers intruded between the extracted pair of filamentary fibers from becoming infinite, the following procedure is taken: a distance ($d_c$) between the filamentary fiber that is more apart from the collecting face side of the extracted pair of the two filamentary fibers and the outermost part of the nonwoven fabric on the collecting face side is compared with the intrusion depth; when the intrusion depth is 1.41 times $d_c$ or more, the intrusion depth of the combination of two filamentary fibers is defined as 1.41 times $d_c$. The diameter (D) (μm) of the filamentary fibers is obtained by the method of measuring a fiber diameter. The intrusion index is calculated (numerical value beyond the second place of decimals being rounded) from the following formula:

$$\text{intrusion depth} = dD \quad (1)$$

Note: For observation of the cross section, even when a filamentary fiber is intertwined with many melt-blown fine fibers, the contact portions of both types of fibers to be extracted can be easily observed by microscopic observation in comparison with electron microscopic observation.

(6) Measurements of Crystallinity [%]

Sample fibers in an amount of about 8 mg are weighed, and placed in a sample pan. A sample is prepared from the sample fibers using a sample sealer. Using DSC 210 (trade name, manufactured by SII Nanotechnology K.K.), measurements are made under the following conditions: a measurement atmosphere of nitrogen; a nitrogen gas flow rate of 50 ml/min; a heating rate of 10° C./min; and measurement temperatures of 25 to 300° C.

Because a polyester has a cold crystallization portion, the crystallinity (numerical value beyond the first place of decimals being rounded) is obtained from the following formula:

Crystallinity %=(Latent heat of fusion–Heat of cold crystalline state portion)/calorific value of complete crystals Enthalpy of fusion of PET crystalline state: 126.4 J/g ("Macromol Physics" Academic Press, New York & London Vol. 1, p 389 (1973))

Enthalpy of fusion of PP crystalline state: 165 J/g (J. Chem. Phys. Ref. Data, 10 (4) 1981 1051)

Enthalpy of fusion of nylon 6 crystalline state: 190.8 J/g (J. Polymer Sci. A-1, 1 2697 (1963))

(7) Measurements of Water Pressure Resistance [kPa] of Nonwoven Fabric

Both ends, each 10 cm long, of a sample nonwoven are removed, and one square test piece, 18 cm×18 cm, is prepared per 20 cm width of the fabric. The water pressure resistance of the test piece is measured in accordance with JIS L1092. The average of the data is calculated (numerical value beyond the second place of decimals being rounded).

(8) Method of Measuring Solution Viscosity [$\eta_{sp}/c$]

A sample in an amount of 0.025 g is dissolved in 25 ml of o-chlorophenol (OCP). The mixture is heated to 90° C. (further heated to 120° C. when the sample is not dissolved) so that the sample is dissolved. Measurements are made at 30° C. with a viscosity tube, and the viscosity is calculated from the formula shown below. Three samples are used, and the data are arithmetically averaged, followed by rounding the numerical value beyond the second place of decimals.

$$\eta_{sp}/c = ((t-t_0)/t_0)/c$$

wherein $t_0$ is a passing time in terms of sec of the solvent, t is a passing time in terms of sec of the solution, and c is an amount of the solute in terms of g per 1,000 ml of the solution.

(9) Method of Measuring Relative Viscosity [$\eta_{rel}$]

A sample in an amount of 0.025 g is dissolved in 25 ml of 98% sulfuric acid at room temperature. Measurements are made at 25° C. with a viscosity tube. Three samples are used, and the data are arithmetically averaged, followed by rounding the numerical value beyond the first place of decimals.

$$\eta_{rel} = t/t_0$$

wherein $t_0$ is a passing time in terms of sec of the solvent, and t is a passing time in terms of sec of the solution.

Examples 1 to 4

A filamentary fiber group of a polyethylene terephthalate for general purposes was extruded toward a transfer collecting face by spin bonding at a spinning temperature of 300° C., and spun at a spinning rate of 3,500 m/min. The spun fibers were adequately opened by corona charging in a charging amount of about 3 μC/g to give an unbonded filamentary fiber web composed of filaments that had an average fiber diameter of 13 μm and having a basis of weight of 25 g/m² (5 cm variation of basis of weight of 15% or less (uniformity)), on a collecting net face.

On the other hand, a polyethylene terephthalate having a solution viscosity $\eta_{sp}/C$ of 0.50 was spun by melt blowing at a spinning temperature of 300° C. and a heating air temperature of 320° C. with injection air of 1,000 Nm³/hr/m to give a random web of extremely fine fibers (average fiber diameter of 1.6 μm) having a basis of weight of 10 g/m². The random web was directly injected toward the above filamentary fiber web. The upper face of the filamentary fiber web was 100 mm away from the melt blowing nozzles, and the suction and air speed on the collecting face directly below the melt blowing nozzles were set at 0.2 kPa and 7 m/sec, respectively. A melt-blown extremely fine fiber web/filamentary web (abbreviated to MW/SW1) in which intrusion of the deposited melt-blown extremely fine fibers into the web layer of gathered filamentary fibers was promoted was thus prepared.

A filamentary fiber web of a polyethylene terephthalate was prepared and opened in the same manner as in the above preparation and placed on the face of the extremely fine fiber web of the melt-blown fine fiber web/filamentary fiber web to directly give a stacked three-layer web (SW2/MW/SW1) composed of filamentary fiber web/melt-blown fine fiber web/filamentary fiber web. The SW2/MW/SW1 was subsequently passed through emboss rolls and flat rolls to effect thermocompressive bonding. A laminated three-layer stacked nonwoven fabric (S/M/S) in which the stacked layer nonwoven fabric structure was fixed was thus obtained. Laminated nonwoven fabrics in Examples 1 to 4 were prepared under the following thermocompressive bonding conditions: the emboss rolls had fabric folding weave patterns and an area ratio of 14.4%; the line pressure between the flat rolls was 365 N/cm (constant); the emboss roll temperature differed among examples. Data related to thermocompressive bonding conditions, structures of the nonwoven fabrics and properties for use in the nonwoven fabrics in Examples 1 to 4 are shown. Measurements of fluff formation resistance were made on the samples on the collecting face side.

Comparative Examples 1 to 4

A polyethylene terephthalate (having a solution viscosity $\eta_{sp}/C$ of 0.50) was discharged through melt blowing nozzles on a collecting face 100 mm apart from the nozzles under the following melt blow spinning conditions: a spinning temperature of 300° C.; a heating air temperature of 320° C.; and a discharging gas amount of 1,000 Nm³/hr. The self-bonded, melt-blown extremely fine fiber nonwoven fabric thus obtained was composed of extremely fine fibers having an average fiber diameter of 1.6 μm and a basis of weight of 10 g/m².

The melt-blown extremely fine fiber nonwoven fabric prepared above was unwound on the upper face of the filamentary fiber web (SW1) having been prepared by spun bonding in the same manner and under the same conditions as in Examples 1 to 4, and directly stacked; a continuous filamentary fiber web (SW2) of a polyethylene terephthalate spun by spun bonding under the same conditions as in the above first filamentary fiber web was further stacked immediately to give a stacked three-layer web (SW/MW/SW). The web was then thermocompressively bonded under the same conditions as in Examples 1 to 4 to give a laminated three-layer nonwoven fabric.

Samples were collected in Comparative Examples 1 to 4.

Table 1 shows data related to thermocompressive bonding conditions, structures of the laminated nonwoven fabrics and properties for use of the nonwoven fabrics in Comparative Examples 1 to 4. Measurements of fluff formation resistance were made on the samples on the collecting face side.

TABLE 1

| | Examples (1-4)/Comparative Examples (1-4) | | | | |
|---|---|---|---|---|---|
| | Preparation conditions | Properties of nonwoven fabrics | | Tensile tenacity | |
| | Roll temperature ° C. | Intrusion index | Fluff formation resistance Grade | Average N/3 cm | Improvement ratio % |
| Ex. 1 | 170 | 0.40 | 3.0 | 68 | 21.4 |
| Ex. 2 | 190 | 0.38 | 3.5 | 92 | 15.0 |
| Ex. 3 | 210 | 0.41 | 3.8 | 108 | 17.4 |

TABLE 1-continued

Examples (1-4)/Comparative Examples (1-4)

| | Preparation conditions | Properties of nonwoven fabrics | | Tensile tenacity | |
|---|---|---|---|---|---|
| | Roll temperature °C. | Intrusion index — | Fluff formation resistance Grade | Average N/3 cm | Improvement ratio % |
| Ex. 4 | 220 | 0.40 | 4.0 | 100 | 13.6 |
| Comp. Ex. 1 | 170 | 0.15 | 3.0 | 56 | — |
| Comp. Ex. 2 | 190 | 0.18 | 3.5 | 80 | — |
| Comp. Ex. 3 | 210 | 0.16 | 3.8 | 92 | — |
| Comp. Ex. 4 | 220 | 0.17 | 4.0 | 88 | — |

Figure 4:
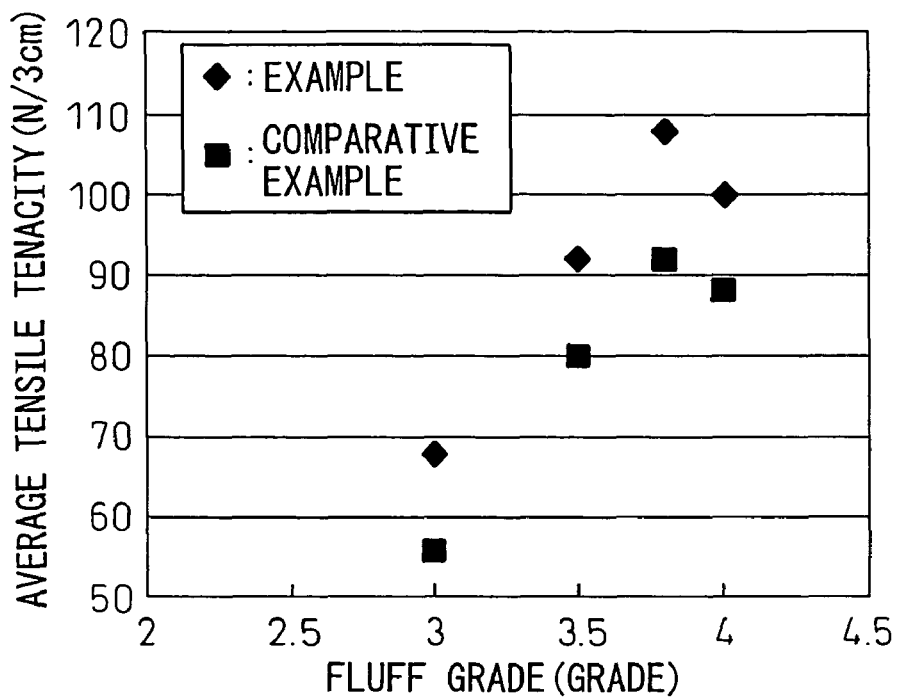
FIG. 4 is a graph showing an average tensile tenacity against a fluff grade of a spun-bonded laminated nonwoven fabric in any one of Examples 1 to 4 and Comparative Examples 1 to 4 in the present invention.
Figure 5:
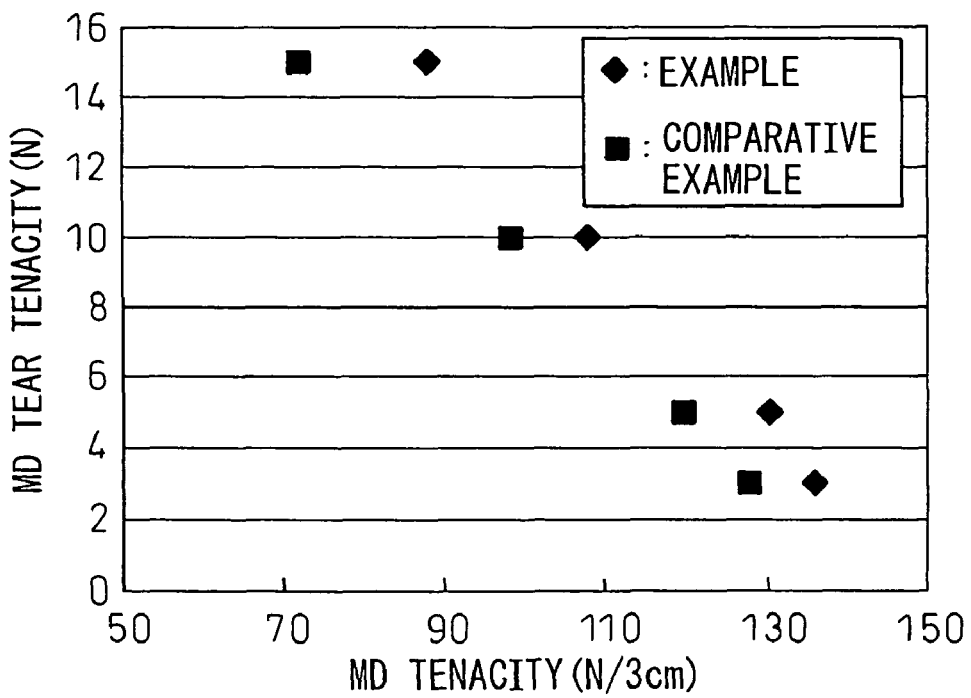
FIG. 5 is a graph showing a correlation between a tear tenacity and a tensile tenacity shown by a spun-bonded laminated nonwoven fabric in any one of Examples 5 to 8 and Comparative Examples 5 to 8 in the present invention.

Table 1 shows that the laminated nonwoven fabric of the present invention has a significantly improved tenacity of 10% or more in comparison with the laminated nonwoven fabric in any one of Comparative Examples 1 to 4, although the laminated nonwoven fabric of the invention has a fixed nonwoven fabric structure having a grade of fluff formation resistance comparable to that in the corresponding comparative example. The laminated nonwoven fabric of the invention even in Example 2 or 4 in which the emboss roll temperature is high shows an improved tensile tenacity. The results therefore show that when the nonwoven fabric structure can be fixed (refer to FIG. 4) without impairing the mechanical physical properties thereof, portions not in the embossed ones show reinforcement that is undoubtedly understood to be a tensile tenacity caused by the effects of intrusion.

Examples 5 to 8

Stacked three-layer webs (SW2/MW/SW1) prepared under the same conditions as in Examples 1 to 4 were thermocompressively bonded while the emboss temperature was varied so that the tear tenacities in the MD direction attained given values. Laminated three-layer nonwoven fabrics in which the structures were fixed were thus prepared. Table 2 shows the properties for use of the nonwoven fabrics.

Comparative Examples 5 to 8

Stacked three-layer webs (SW/MW/SW) prepared under the same conditions as in Comparative Examples 1 to 4 were thermocompressively bonded while the emboss temperature was varied so that the tear tenacities in the MD direction attained given values. Laminated three-layer nonwoven fabrics in which the structures were fixed were thus prepared. Table 2 shows the properties for use of the nonwoven fabrics.

TABLE 2

Examples (5 to 8)/Comparative Examples (5 to 8)

| | Properties of nonwoven fabrics Intrusion index — | Tear tenacity MD direction N | Tensile tenacity MD direction N/3 cm |
|---|---|---|---|
| Ex. 5 | 0.40 | 15 | 88 |
| Ex. 6 | 0.42 | 10 | 108 |
| Ex. 7 | 0.40 | 5 | 130.4 |
| Ex. 8 | 0.39 | 3 | 136 |
| Comp. Ex. 5 | 0.16 | 15 | 72 |
| Comp. Ex. 6 | 0.18 | 10 | 98.4 |
| Comp. Ex. 7 | 0.18 | 5 | 120 |
| Comp. Ex. 8 | 0.17 | 3 | 128 |

Table 2 shows that an increase in the degree of intrusion of the fine fibers into the spun-bonded continuous filamentary fiber layer increases the fixed points of the nonwoven fabric structure in the interior of the nonwoven fabric formed by bonding, surrounding, interlacing, and the like of the fine fibers with the continuous filamentary fibers, and that the tear tenacity of the nonwoven fabric is increased as a result, even when the tenacity of the nonwoven fabric is comparable.

It is important that a laminated nonwoven fabric used as a filter hardly deform the network structure of the fine fiber structure within the nonwoven fabric during deformation caused by heating or during passage of a fluid. The laminated nonwoven fabric of the invention forms a structure in which many melt-blown extremely fine fibers are intruded into the cross section of the continuous filamentary fiber layer. As a result, the tensile tenacity is increased, and the modulus and the tear tenacity are increased in accordance with the increases. It is therefore understood that the network structure of the fine fiber structure within the nonwoven fabric is hardly deformed.

Example 9

The nonwoven fabric prepared in Example 3 was coated with a fluorine type water repellent containing 1% of a pure effective component, and sufficiently dried. Table 3 shows the results of measuring the water pressure resistance.

Comparative Example 9

The nonwoven fabric prepared in Comparative Example 3 was coated with a fluorine type water repellent containing 1% of a pure effective component, and sufficiently dried. Table 3 shows the results of measuring the water pressure resistance.

TABLE 3

Example (9)/Comparative Example (9)

| | Intrusion index — | Water pressure resistance kPa |
|---|---|---|
| Example 9 | 0.41 | 0.65 |
| Comparative Example 9 | 0.16 | 0.45 |

Table 3 shows the results of evaluating the water pressure resistance that is a measuring method involving deformation of the network structure in order to observe reinforcement of the network structure of the fine fiber structure caused by intrusion of the fine fibers by melt blowing. It is understood that the nonwoven fabric of the invention shows good filtering and barrier effects due to the improvement of a water pressure resistance.

Example 10

A stacked three-layer web (SW2/MW/SW1) prepared under the same conditions as in Examples 1 to 4 was integrated by thermocompressive treatment with flat rolls. The line pressure was set at 270 N/cm, and the fluff formation resistance was adjusted by flat roll temperatures to give a laminated nonwoven fabric in Example 10. Table 4 shows data on the structure and properties for use of the laminated nonwoven fabric.

Comparative Example 10

A stacked three-layer web (SW/MW/SW) prepared under the same conditions as in Comparative Examples 1 to 4 was integrated by thermocompressive treatment with flat rolls. The line pressure was set at 270 N/cm, and the fluff formation resistance was adjusted by flat roll temperatures to give a laminated nonwoven fabric in Comparative Example 10. Table 4 shows data on the structure and properties for use of the laminated nonwoven fabric.

Calender thermocompressive bonding with a flat press significantly increases the tensile tenacity in comparison with emboss thermocompressive bonding due to the intrusion of the fine fiber layer to a large degree.

TABLE 4

Example (10)/Comparative Example (10)

| | Intrusion index — | Fluff Grade | Average tenacity N/3 cm | Improvement ratio % |
|---|---|---|---|---|
| Ex. 10 | 0.60 | 2.5 | 128 | 28.0 |
| Comp. Ex. 10 | 0.32 | 2.5 | 100 | — |

Examples 11 to 12

A filamentary fiber group of a nylon 6 for general purposes was extruded and spun onto a transfer collecting face by spun bonding at a spinning temperature of 265° C. The spun fibers were adequately opened by corona charging them in a charging amount of about 6 µC/g to give an unbonded filamentary fiber web composed of filaments that had an average fiber diameter of 15 µm and a basis of weight of 25 g/m² (variation of 5 cm basis of weight of 15% or less (uniformity)) on a collecting net face. On the other hand, a nylon 6 (solution relative viscosity $\eta_{rel}$ of 2.1) was spun by a known melt blowing method at a spinning temperature of 270° C. and a heating air temperature of 320° C. with a blowing air rate of 1,100 Nm³/hr/m to give a melt-blown fine fiber web of nylon 6 (average fiber diameter of 1.6 µm) having a basis of weight of 10 g/m². A spun-bonded web of nylon 6 having a basis of weight of 25 g/m² was prepared similarly to the above first web, and placed on the melt-blown web to give a stacked three layer web (SW2/MW/SW1). The stacked web was thermocompressively bonded in the same manner as in Examples 1 to 4 with the same emboss rolls at the same line pressure. The fluff formation resistance was adjusted at an emboss temperature to give a laminated web of Example 11. Moreover, a laminated web having an entire basis of weight of 40 g/m² was prepared in Example 12 in the same manner except that the line speed was varied. Table 5 shows data on the structures and properties for use of the nonwoven fabrics.

Comparative Examples 11 to 12

A nylon 6 (having a solution relative viscosity $\eta_{rel}$ of 2.1) was discharged by a known melt blowing method through melt-blowing nozzles on a collecting face 100 mm apart from the nozzles under the following conditions: a spinning temperature of 270° C.; a heating air temperature of 320° C.; and a blowing gas flow rate of 1,100 Nm³/hr/m. The self-bonded, melt-blown extremely fine fiber nonwoven fabric thus obtained was composed of extremely fine fibers having an average fiber diameter of 1.6 µm and a basis of weight of 10 g/m² (6.7 g/m²). The melt-blown extremely fine fiber nonwoven fabric prepared above was unwound on the upper face of a filamentary fiber web (SW) prepared by spun bonding in the same manner and under the same conditions as in Examples 11 to 12, and directly placed thereon; a continuous filamentary fiber web (SW) of a nylon 6 spun by spun bonding under the same conditions as in the above first filamentary fiber web was further stacked to give a stacked three-layer web (SW/MW/SW). The stacked web was then thermocompressively bonded under the same conditions as in Examples 11 to 12 to give a laminated three-layer nonwoven fabric with the same emboss rolls, and at the same line pressure, as in Examples 1 to 4. The fluff formation resistance was adjusted by the emboss roll temperature to give a laminated nonwoven fabric of Example 11. A laminated nonwoven fabric of Comparative Example 12 was prepared in the same manner as in Comparative Example 11 except that the melt-blown extremely fine fiber nonwoven fabric prepared above and having a basis of weight of 6.7 g/m² was supplied while the line speed was varied.

Table 5 shows data related to structures and properties for use of the nonwoven fabrics in Examples 11 to 12 and Comparative Examples 11 to 12.

TABLE 5

Examples (11 to 12)/Comparative Examples (11 to 12)

| | Intrusion index — | Fluff Grade | Average tenacity N/3 cm | Improvement ratio % |
|---|---|---|---|---|
| Ex. 11 | 0.41 | 3.2 | 140 | 16.7 |
| Ex. 12 | 0.38 | 2.8 | 88 | 17.3 |
| Comp. Ex. 11 | 0.23 | 3.2 | 120 | |
| Comp. Ex. 12 | 0.21 | 2.8 | 75 | |

Similarly to the polyester nonwoven fabrics, the nylon nonwoven fabrics also show improved tenacities. It has been confirmed that a high tenacity laminated nylon SMS nonwoven fabric excellent in flexibility and having outstanding designability, because of its dyeability and printability, can be prepared from a nylon spun-bonded nonwoven fabric.

Examples 13 to 15

A stacked three-layer web (SW2/MW/SW1) prepared under the same conditions as in Examples 1 to 4 was integrated by thermocompressive bonding with emboss rolls. The fiber diameter of the melt-blown fine fibers was adjusted with a heated blowing air amount, and the amount of the filamentary fibers was adjusted by a number of spinning nozzle holes of the filamentary fibers. The line pressure of the emboss rolls that made the basis of weight of the two spun-bonded webs to be arranged on both respective sides of the melt-blown fine fiber layer equal to each other was 365 N/cm, and the roll temperature was 210° C. Laminated nonwoven fabrics in Examples 13 to 15 were thus obtained. Table 6 shows data on the structures and properties for use of the laminated nonwoven fabrics.

Examples 16 to 18

A stacked three-layer web (SW2/MW/SW1) prepared under the same conditions as in Examples 10 to 11 was integrated by thermocompressive bonding with flat rolls. The fiber diameter of the melt-blown fine fibers that made the basis of weight of the two spun-bonded webs to be arranged on both sides of the melt-blown fine fiber layer equal to each other was adjusted by a heating air amount, and the basis of weight of each filamentary fibers was adjusted on the basis of the spinning nozzle holes. The line pressure was 270 N/cm, and the roll temperature was 210° C. Laminated nonwoven fabrics in Examples 16 to 18 were thus obtained. Table 6 shows data on the structures and properties for use of the laminated nonwoven fabrics.

TABLE 6

Examples (13 to 18)

| | Total basis of weight g/m² | MB basis of weight g/m² | Fiber diameter μm | Intrusion index — | Air permeability ml/cm²/sec |
|---|---|---|---|---|---|
| Ex. 13 | 70 | 11.7 | 1.8 | 0.39 | 10.0 |
| Ex. 14 | 30 | 7 | 1.8 | 0.44 | 31.0 |
| Ex. 15 | 70 | 16.3 | 1.8 | 0.40 | 5.0 |
| Ex. 16 | 72 | 16.7 | 4.6 | 0.54 | 7.7 |
| Ex. 17 | 72 | 16.7 | 2.2 | 0.61 | 2.2 |
| Ex. 18 | 72 | 12 | 1.5 | 0.56 | 2.5 |

A laminated nonwoven fabric prepared by intruding the fine fibers into the continuous filamentary fibers and integrating the stacked web through thermocompressive bonding showed a suitable air permeability in view of the fiber diameter and amount of the melt-blown fine fibers. The laminated nonwoven fabric is one example in which the intrusion neither changed the barrier function of the fine fibers to such an extent that the fine fiber structure disappeared nor melted the fine fiber structure to such an extent that the fine fiber structure became filmy and lost a filtering function.

Examples 19 to 20, Comparative Examples 13 to 14

A stacked three-layer web (SW2/MW/SW1) prepared under the same conditions as in Examples 1 to 4 was integrated by compressive bonding with emboss rolls. The line speed was adjusted so that the total basis of weight became 30 g/m². The line pressure was 365 N/cm and the roll temperature was 210° C. (constant). The crystallinity of the melt-blown fine fibers was adjusted by adjusting the heating air amount to 500 to 1,500 Nm³/hr/m. The laminated nonwoven fabrics in Examples 19 to 20 and Comparative Examples 13 to 14 were thus obtained. A laminated nonwoven fabric was produced by operating the thermocompressive emboss rolls and flat rolls. The operation was continued for 30 minutes, and staining of the rolls was determined by the following criteria: when fibers in the nonwoven fabric surface were not pulled up by the rolls, the rolls were judged to be not stained (denoted by o); and when fibers therein were pulled up by the rolls, the rolls were judged to be stained (denoted by x).

TABLE 7

Examples (19 to 20)/Comparative Examples (13 to 14)

| | Crystallinity % | Roll staining | Average tenacity N/cm |
|---|---|---|---|
| Comp. Ex. 13 | 14.1 | x | 61 |
| Ex. 19 | 17.8 | o | 59 |
| Ex. 20 | 34.3 | o | 58 |
| Comp. Ex. 14 | 40.5 | o | 54 |

It is thought that an excessively high crystallinity lowers the bonding tenacity, and is related to the degree of intrusion. When the crystallinity is excessively low, the melt-blown fine fibers are exposed to the surface layer from the embossed portion or gaps among filamentary fibers. The fine fibers are softened and adhere to the thermocompressive bonding rolls to induce roll staining. The fine fibers adhering to the rolls stick to the fabric surface again, or peel off the fibers in the fabric surface; or the rolls take up the laminated nonwoven fabric being produced. As a result, stabilized production of the nonwoven fabric cannot be conducted. It is thought that the magnitude of the crystallinity is important.

INDUSTRIAL APPLICABILITY

The laminated nonwoven fabric of the present invention is a spun-bonded laminated nonwoven fabric having a laminated nonwoven fabric structure in which continuous filamentary fiber layers are arranged to hold a melt-blown fine fiber layer therebetween, at least one of the continuous filamentary fiber layers having an intimately mixed layer that contains the melt-blown fine fibers that are intruded into the filamentary fiber layer at an intrusion index of 0.36 or more, excellent in mechanical physical properties such as tensile tenacity, and having filtering and barriering properties.

The laminated nonwoven fabric of the invention is a spun-bonded nonwoven fabric material having various filtering and barrier functions that are durable due to the fine fiber layer forming the nonwoven fabric structure, and is much more excellent in tensile tenacity than the corresponding spun-bonded nonwoven fabric.

The invention claimed is:

1. A high tenacity nonwoven fabric wherein the nonwoven fabric is a laminated fabric formed by integrating, through compressive bonding, three stacked layers comprising an upper and a lower thermoplastic synthetic filamentary fiber layer having a fiber diameter from 7 μm or more to 20 μm, and at least one intermediate layer composed of at least one thermoplastic synthetic fine fiber layer having a fiber diameter of 5 μm or less, the laminated nonwoven fabric having an intimately mixed structure layer in which a portion of the fine fibers forming the intermediate layer is intruded into at least one face side of the filamentary fiber layers with an intrusion index of 0.36 or more to bond, surround or interlace the filamentary fibers, a basis of weight of from 10 g/m² or more to 250 g/m², and a bulk density of 0.20 g/cm³ or more, the fine fibers having a crystallinity from 17.8% or more to 34.3%, and the thermoplastic resin forming the fine fibers being mainly composed of a polyester or a copolymer of a polyester, or a mixture of the polyester and the copolymer, which are prepared by polymerizing an aromatic dicarboxylic acid and a diol, and have a solution viscosity $\eta_{sp}/c$ from 0.2 to 0.8, or a polyamide resin or a copolymer of a polyamide resin, or a mixture of the polyamide resin and the copolymer, which have a solution relative viscosity $\eta_{rel}$ from 1.8 to 2.7.

2. The high tenacity nonwoven fabric according to claim 1, wherein the fine fibers have a fiber diameter of 3 μm or less.

3. The high tenacity nonwoven fabric according to claim 1, wherein the nonwoven fabric has a content of the fine fibers of 50% by weight or less.

4. The high tenacity nonwoven fabric according to claim 1, wherein the thermoplastic resin forming the filamentary fibers is mainly composed of a polyester or a copolymer of a polyester, or a mixture of the polyester and the copolymer, and the thermoplastic resin forming the fine fibers is mainly composed of a polyester or a copolymer of a polyester, or a mixture of the polyester and the copolymer, which are prepared by polymerizing an aromatic dicarboxylic acid and a diol.

5. The high tenacity nonwoven fabric according to claim 1, wherein the thermoplastic resin forming the filamentary fibers is mainly composed of a polyamide resin or a copolymer of a polyamide resin, or a mixture of the polyamide resin and the copolymer, and the thermoplastic resin forming the fine fibers is mainly composed of a polyamide resin or a copolymer of a polyamide resin, or a mixture of the polyamide resin and the copolymer.

* * * * *